No. 787,191. Patented April 11, 1905.

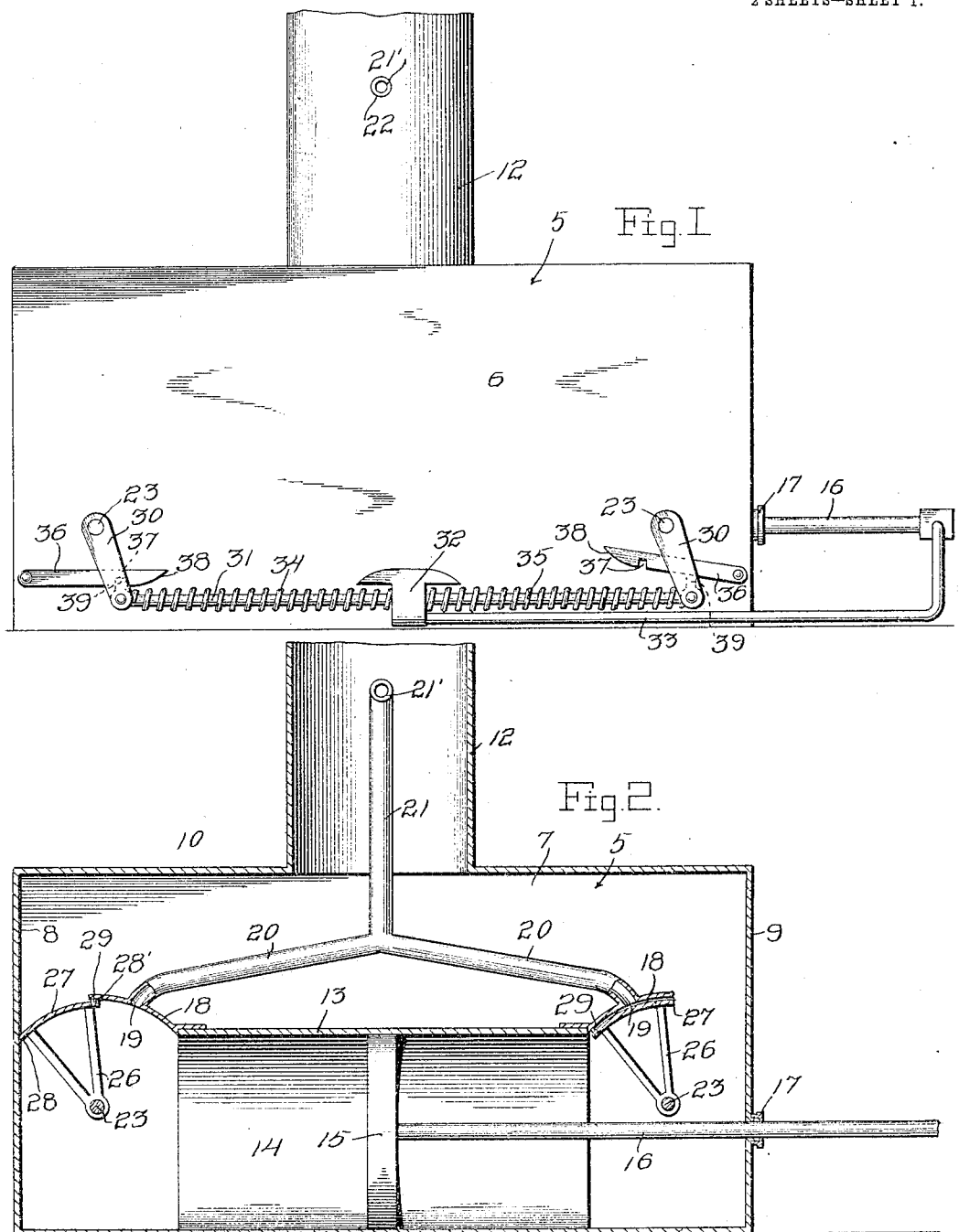

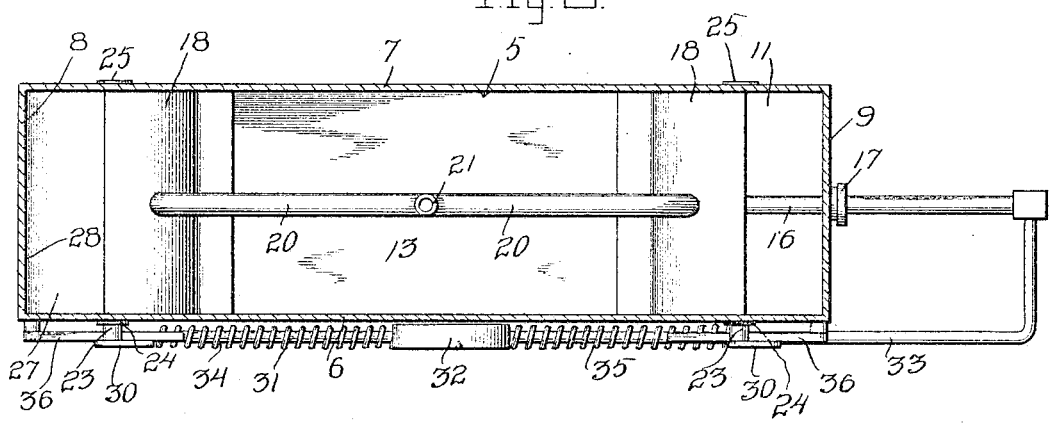

UNITED STATES PATENT OFFICE.

WILLIAM W. KREWSON, OF LAMBERTVILLE, NEW JERSEY.

WATER-MOTOR.

SPECIFICATION forming part of Letters Patent No. 787,191, dated April 11, 1905.

Application filed July 9, 1904. Serial No. 215,964.

*To all whom it may concern:*

Be it known that I, WILLIAM W. KREWSON, a citizen of the United States, residing at Lambertville, in the county of Hunterdon, State of New Jersey, have invented certain new and useful Improvements in Water-Motors; and I do hereby declare the following to be a full, clear, and exact description of the invention, such as will enable others skilled in the art to which it appertains to make and use the same.

This invention relates to motors, and more particularly to water-motors, and has for its object to provide a mechanism of this nature the parts of which will be arranged in compact form and in which the usual fly-wheel will be eliminated.

A further object is to provide a construction in which the pipes will be prevented from freezing.

Other objects and advantages will be apparent from the following description, and it will be understood that modifications of the specific construction shown may be made and any suitable materials and proportions may be used without departing from the spirit of the invention.

In the drawings forming a portion of this specification, and in which like numerals of reference indicate similar parts in the several views, Figure 1 is a side elevation of the motor. Fig. 2 is a longitudinal section of Fig. 1. Fig. 3 is a top plan view of the working parts.

Referring now to the drawings, the present invention comprises a hollow water-tight casing 5, including side walls 6 and 7, end walls 8 and 9, top 10, and bottom 11, and communicating with the interior of the casing through the top 10 is a water-supply pipe 12.

Disposed within the casing and spaced from the ends and top thereof is a body 13, having a cylindrical passage 14 formed therethrough, in which there is slidably disposed a piston 15, which is secured to a piston-rod 16, which extends outwardly of the casing through a stuffing-box 17 in the wall 9. Secured to the ends of the body 13, at the upper edges thereof, are plates 18, which extend upwardly in an arc through substantially half the distance between the ends of the body 13 and the end walls of the casing, and these plates are provided with openings 19 therethrough, in which are disposed the ends of pipes 20, which extend toward the center of the casing and are connected with a pipe 21, which extends upwardly for a considerable distance within the pipe 12 and has its upper end 21' turned and passed outwardly through an opening 22 in the pipe 12.

The ends of the plates 18 rest against the inner faces of the walls 6 and 7 and form a tight union therewith, and disposed below the plates 18 are transverse shafts 23, which are journaled in bearings 24 and 25 at the sides of the casing, the bearings 24 being in the form of stuffing-boxes, through which the shafts extend outwardly of the casing. Secured at their points to the shafts 23 are V-shaped members 26, which lie parallel to each other, and secured to the outer ends of these V-shaped members are arc-shape plates 27, which have their convex faces directed outwardly and which are arranged to lie at times against the under faces of the plates 18 to close the openings 19 thereof and at times to form continuations of these plates and lie with their outer edges 28 against the inner faces of the walls 8 and 9 to close the spaces between these walls and the outer edges of the plates 18. When in this position, the inner edge portions 28' of the plates 27 lie against the under faces of the outer edge portions of the plates 18, and the plates 27 are provided with packing-strips 29 to prevent the leakage of water between the two plates.

Secured to the outer ends of the shafts 23 are parallel cranks 30, and these cranks are pivotally connected to the ends of a pitman 31, the relative positions of the plates 27 being such that when one of these plates is lying against the under face of its corresponding plate 18 the remaining plate 27 forms a continuation of the remaining plate 18 and lies in position to close the space between the outer edges of this plate and the adjacent end wall of the casing.

Slidably disposed upon the pitman 31 is a block 32, which is connected, by means of angular arm 33, to the outer end of the piston-rod 16, and disposed between the block 32 and the cranks 30 and surrounding the pitman 31 are helical springs 34 and 35.

Pivoted adjacent to the cranks 30 are latches 36, having notches 37 in their lower edges, these edges being beveled upwardly at the free ends of the latches, as shown at 38. Each of the cranks 30 carries a lug 39, which when the adjacent plate 27 lies in position to close the space between its corresponding plate 18 and end wall of the casing lies in engagement with the notch 37 of the adjacent latch 36. At this time the remaining plate 27 lies beneath the remaining plate 18, and if water is permitted to pass through the supply-pipe 12 it will pass between this plate 18 and the adjacent end wall of the casing and will move the piston 15 within the passage 14.

At the same time the block 32 will be moved along the pitman 31 and will compress one of the helical springs until the upper end of the block comes into engagement with the bevel edge 38 of the latch 36, which is in engagement with the lug 39, and will disengage this latch from the lug, which will permit of movement of the pitman under the tension of the compressed spring to reverse the positions of the plates 27, when the movement of the piston will be reversed, as will be readily understood.

The pipes 20 and 21 act as exhaust-passages, and as the piston is moved within the passage 14 the water lying in the direction of its movement is forced outwardly through these pipes.

By reason of the fact that the pipe 21 is disposed within the pipe 12 it is prevented from freezing in cold weather, the large volume of water within the pipe 12 protecting it sufficiently from the cold, and it will be understood that the pipe 12 is of such a size that the water therewithin would freeze only in the coldest weather.

What is claimed is—

1. A fluid-motor comprising a casing, a fluid-supply pipe communicating with the casing, a body disposed within the casing and spaced from the top and ends thereof and having a cylindrical opening therethrough, plates secured to the ends of the body and extending toward the ends of the casing, valves arranged for movement to close and open the spaces between the free edges of the plates and the ends of the casing, a piston slidably disposed within the cylindrical opening, means connected with the piston for moving the valves alternately into operative and inoperative position when the piston is reciprocated, and exhaust-pipes communicating with the opposite ends of the cylindrical opening.

2. A fluid-motor comprising a casing, a body disposed within the casing and spaced from the top and ends thereof and having a cylindrical opening therethrough communicating at its ends with the spaces between the body and the ends of the casing, plates secured to the body and extending toward the ends of the casing and spaced therefrom, valves disposed for movement to close and open the spaces between the plates and the ends of the casing, said valves being arranged to lie one in operative position when the other is in inoperative position, a piston slidably disposed within the cylindrical opening, connections between the piston and the valves for operation of the latter when the former is reciprocated, and a fluid-supply pipe communicating with the upper portion of the casing between the valves.

3. A fluid-motor comprising a casing, a body disposed within the casing and spaced from the top and ends thereof and having a cylindrical opening therethrough, valves disposed at opposite ends of the body and arranged for movement to close and open the communication of the spaces between the body and the ends of the casing with that above the body, parallel cranks connected with the valves for movement in an arc to move the valves into operative and inoperative positions, a pitman pivoted at its ends to the cranks, a block slidably disposed upon the pitman, a piston slidably disposed within the cylindrical opening, springs disposed upon the pitman between the block and the cranks, means for holding the valves against movement, connections between the piston and the block for reciprocating the latter upon the pitman to compress the springs alternately, said block being arranged for engagement of the holding means to move the latter into inoperative position to permit of movement of the pitman under the action of the compressed spring to reverse the positions of the valves, and exhaust-pipes communicating with the opposite ends of the cylindrical opening.

In testimony whereof I affix my signature in presence of two witnesses.

WILLIAM W. KREWSON.

Witnesses:
O. C. HOLCOMBE,
H. C. BARKLEY.